US012756585B2

(12) United States Patent
Sethi et al.

(10) Patent No.: US 12,756,585 B2
(45) Date of Patent: Oct. 6, 2026

(54) DYNAMIC MANAGEMENT OF ENERGY EFFICIENT ETHERNET FEATURE

(71) Applicant: Cisco Technology, Inc., San Jose, CA (US)

(72) Inventors: Kabiraj Sethi, Freemont, CA (US); Eric A. Voit, Bethesda, MD (US); Rajeev Malhotra, Milpitas, CA (US); Ramesh C Yeevanisrinivas, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 18/890,678

(22) Filed: Sep. 19, 2024

(65) Prior Publication Data

US 2026/0081797 A1 Mar. 19, 2026

(51) Int. Cl.
*H04L 12/12* (2006.01)
*H04L 41/0833* (2022.01)

(52) U.S. Cl.
CPC .......... *H04L 12/12* (2013.01); *H04L 41/0833* (2013.01)

(58) Field of Classification Search
CPC ...... H04L 12/12; H04L 41/0833; H04L 12/10
See application file for complete search history.

(56) References Cited

U.S. PATENT DOCUMENTS 9,223,377 B1 * 12/2015 Nachum ............... G06F 1/3209
10,348,511 B1 * 7/2019 Bagg ..................... G06F 1/3278
11,637,713 B1 * 4/2023 Razavi Majomard ....................... H04L 41/0816 370/241
2010/0322078 A1 * 12/2010 Wang ...................... H04L 12/12 370/241
2011/0022699 A1 * 1/2011 Powell .............. H04L 12/40039 709/224
2011/0026416 A1 * 2/2011 Tazebay .............. H04L 43/0811 370/252
2011/0035498 A1 * 2/2011 Shah ....................... H04L 43/10 709/226

(Continued)

OTHER PUBLICATIONS

Rodrguez-Perez M., et al., “Leveraging Energy Saving Capabilities of Current EEE Interfaces via Pre-Coalescing”, arXiv:2005.13267v2, Jun. 6, 2020, 25 Pages.

*Primary Examiner* — Javier O Guzman
(74) *Attorney, Agent, or Firm* — Rutan & Tucker, LLP; Ravi Mohan; Marc A. McClain

(57) ABSTRACT

Devices, systems, methods, and processes for controlling dynamic disablement and re-enablement of an Energy Efficient Ethernet (“EEE”) feature in network devices are described herein. In a network device, the EEE feature is default enabled on each port. A link partner associated with a port is detected and a set of EEE parameters associated with the link partner is determined. The set of EEE parameters includes an EEE capability of the link partner and/or a link quality of a link between the port and the link partner. The EEE feature on the port is disabled on the port based on the link quality being below a threshold, the EEE capability being disabled, the EEE capability being different from that of the port, or the EEE capability being disagreed between the network device and the link partner. The EEE feature is reenabled a predefined time period after the disablement.

20 Claims, 9 Drawing Sheets

(56) References Cited

U.S. PATENT DOCUMENTS

| | | | | |
|---|---|---|---|---|
| 2011/0161522 | A1* | 6/2011 | Diab | H04L 49/35 710/13 |
| 2011/0191608 | A1* | 8/2011 | Vetteth | G06F 1/3209 709/227 |
| 2011/0249592 | A1* | 10/2011 | Tseng | H04L 69/24 370/254 |
| 2012/0127894 | A1* | 5/2012 | Nachum | H04L 12/10 370/255 |
| 2012/0188885 | A1* | 7/2012 | Tazebay | H04L 41/0816 370/252 |
| 2012/0287829 | A1* | 11/2012 | Chang | H04L 12/12 370/296 |
| 2013/0051304 | A1* | 2/2013 | Matthews | H04L 12/12 370/312 |
| 2013/0308941 | A1* | 11/2013 | Diab | H04Q 11/0067 398/45 |
| 2014/0289544 | A1* | 9/2014 | Bailey | G06F 1/3287 713/323 |
| 2015/0163045 | A1 | 6/2015 | Chang et al. | |
| 2016/0277998 | A1* | 9/2016 | Koike | H04L 45/56 |
| 2018/0159999 | A1* | 6/2018 | Ito | G06F 3/1229 |
| 2023/0353395 | A1 | 11/2023 | Jonsson et al. | |

* cited by examiner

DYNAMIC MANAGEMENT OF ENERGY EFFICIENT ETHERNET FEATURE

The present disclosure relates to wired networking. More particularly, the present disclosure relates to dynamic management of an Energy Efficient Ethernet feature in network devices.

BACKGROUND

Network devices form the backbone of modern communication infrastructures. These devices may be responsible for facilitating the exchange of data and enabling connectivity across various computer networks, from local area networks ("LANs") to wide area networks ("WANs"). Often managed through firmware or software interfaces, the network devices may contribute to building and maintaining robust and scalable network infrastructures. Examples of the network devices may include routers, switches, access points, hubs, modems, or the like.

In the current industrial landscape, environmental sustainability is fast becoming a topic of interest. Environmental sustainability may be required to ensure the long-term health and viability of the planet. Environmental sustainability can involve managing natural resources responsibly to meet current needs without compromising the ability of future generations to meet theirs. By adopting sustainable practices, the effects of climate change can be mitigated, and the natural habitats that numerous species, including humans, depend on can be prevented. Hence, there may be a growing impetus for network operators to adopt sustainable practices and energy-efficient network solutions to manage the energy footprint of network devices and minimize the environmental impact. The energy footprint is a measure of the total amount of energy consumed by a network device throughout its lifecycle.

Energy Efficient Ethernet ("EEE") may be implemented in network devices to reduce the energy footprint of the network devices. EEE may be a set of enhancements to the Ethernet networking standard aimed at reducing energy consumption during periods of low data activity. EEE may implement mechanisms that allow Ethernet devices to enter a low-power idle state when a network link is idle, which is useful for decreasing the energy usage of network devices without compromising performance. Thus, to control the energy footprint of network devices, an optimized use of the EEE feature may be required.

SUMMARY OF THE DISCLOSURE

Systems and methods for dynamic management of an Energy Efficient Ethernet ("EEE") feature in accordance with embodiments of the disclosure are described herein. In many embodiments, a device, comprising a processor, one or more ports, and a memory communicatively coupled to the processor, is provided. Each of the one or more ports has an EEE feature default enabled. The memory comprises a feature management logic that is configured to detect a link partner associated with a port of the one or more ports, determine a set of EEE parameters associated with the link partner, and disable the EEE feature on the port based on at least one of the set of EEE parameters being different from an acceptable state.

In a number of embodiments, the set of EEE parameters comprises an EEE capability of the link partner.

In a variety of embodiments, the acceptable state corresponds to at least one of: the EEE capability of the link partner being enabled, the EEE capability of the link partner being same as that of the port, or the EEE capability of the link partner being agreed between the device and the link partner.

In more embodiments, the feature management logic is further configured to receive an EEE advertisement from the link partner and determine the EEE capability of the link partner based on the EEE advertisement.

In additional embodiments, the feature management logic is further configured to disable the EEE feature on the port based on the EEE capability of the link partner being different from that of the port.

In further embodiments, the feature management logic is further configured to disable the EEE feature on the port based on the EEE capability of the link partner being disabled.

In still more embodiments, the feature management logic is further configured to disable the EEE feature on the port based on the EEE capability of the link partner being disagreed between the device and the link partner.

In still further embodiments, the feature management logic is further configured to receive a link signal from the link partner. The link partner is detected based on the link signal.

In still additional embodiments, the set of EEE parameters comprises a link quality of a link between the port and the link partner.

In some more embodiments, the acceptable state corresponds to the link quality being above a threshold.

In yet more embodiments, the feature management logic is further configured to disable the EEE feature on the port based on the link quality being below the threshold.

In still yet more embodiments, the device further includes one or more link quality counters. The feature management logic is further configured to monitor the one or more link quality counters and determine the link quality of the link based on the monitoring of the one or more link quality counters.

In many further embodiments, the link quality is configured to indicate a health status of the link.

In many additional embodiments, the link quality is configured to indicate data traffic accuracy on the link.

In still yet further embodiments, the link quality is defined based on at least one of: a bit error rate, a signal-to-noise ratio, or a number of link flaps associated with the link.

In still yet additional embodiments, the EEE feature on the port is disabled for a time period.

In several embodiments, the feature management logic is further configured to enable the EEE feature on the port upon expiration of the time period.

In several more embodiments, the feature management logic is further configured to initiate auto-negotiation with the link partner after the disablement of the EEE feature on the port.

In numerous embodiments, a device, comprising a processor, one or more ports, and a memory communicatively coupled to the processor, is provided. Each of the one or more ports has an EEE feature default enabled. The memory comprises a feature management logic that is configured to detect a link partner associated with a port of the one or more ports, determine a set of EEE parameters associated with the link partner, and control dynamic disablement and re-enablement of the EEE feature on the port based on the set of EEE parameters.

In numerous additional embodiments, a method is provided. The method comprises detecting a link partner associated with a port of one or more ports of a device. Each of the one or more ports has an EEE feature default enabled. The method further comprises determining a set of EEE parameters associated with the link partner and disabling the EEE feature on the port based on at least one of the set of EEE parameters being different from an acceptable state.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
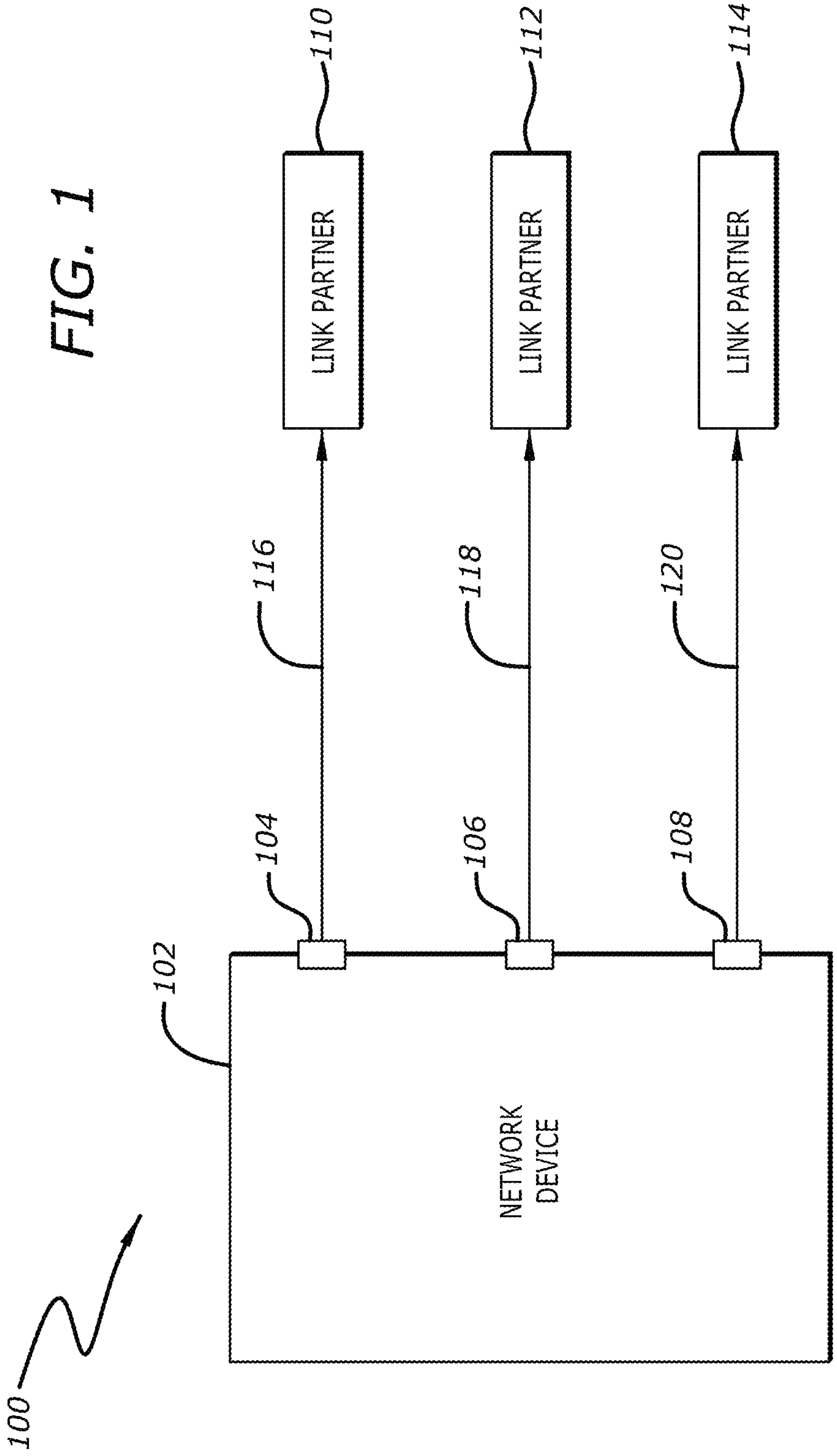
FIG. 1 is a schematic block diagram of a networking environment in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In the present disclosure, devices and methods are discussed that control dynamic disablement and enablement of an Energy Efficient Ethernet ("EEE") feature in network devices. A network device may include hardware and/or software components that facilitate communication and transmission of data between computers or other network-enabled devices. Examples of the network device may include a router, a switch, a hub, a modem, an access point, a server, a computing node, or the like. The network device may include various ports (e.g., Ethernet ports) that facilitate network connectivity. A network device may be in communication with link partners via network links. For example, a link partner may be coupled to a port of a network device by way of a link. In many embodiments, the link partner may include a port to facilitate coupling to the port of the network device. Examples of the link partner may include wireless local area network controllers ("WLCs"), switches, access points, servers, modems, routers, voice over Internet protocol ("VoIP") devices, or the like. A link may be a communication pathway that can couple two or more network devices, enabling data transmission between them.

Traditionally, network devices have not focused on sustainability. Network devices often rely on grid-supplied energy, which can be sourced from environmentally harmful power plants such as coal-powered plants. Modern grids, however, incorporate cleaner energy sources. Power generation, regardless of the source, may lead to negative environmental impacts, such as emissions, land use changes, resource depletion, or the like. These impacts can be quantified using specific units. For instance, coal-powered plants produce carbon emissions, while solar arrays, though emission-free during operation, may cause environmental harm during production and disposal. Various methods can measure these impacts, including waste products generated therefrom.

In order to maximize the overall sustainability of a network, it may be desirable to limit energy usage. To that effect, it may be required to reduce the energy consumed by network devices. EEE may be implemented in a network device to reduce the energy footprint of the network device. EEE may be a set of enhancements to the Ethernet networking standard aimed at reducing energy consumption during periods of low data activity. EEE may implement mechanisms that allow Ethernet devices to enter a low-power idle state when a network link, that connects the network device to another device, is idle. The EEE feature in the network device can thus decrease the energy usage without compromising performance. EEE can contribute to sustainability efforts by reducing energy consumption in Ethernet ports, overall lowering operating costs, extending equipment lifespan, mitigating environmental impact, ensuring regulatory compliance, and enhancing corporate social responsibility efforts. Given the role EEE plays in environment sustainability, an optimized use of the EEE feature in the network device may be required.

Conventionally, the use of the EEE feature in network devices led to various challenges. For example, the network devices on both ends of a network link may not implement the EEE feature in a compatible manner, leading to interoperability errors. Additionally, the use of the EEE feature may result in data traffic and link stability errors. Such errors may be predominant where the link partners either do not have EEE support or where an EEE implementation is not robust enough in some speeds of Ethernet auto-negotiation. Auto-negotiation is an Ethernet protocol that may allow devices to exchange information about their capabilities and automatically configure to the best possible performance settings. As a result, the EEE feature is default disabled in conventional network devices. In such scenarios, the configuration of the EEE feature in the field requires manual intervention. Generally, both network devices of the network link may be managed by different control plane software and/or may have different hardware. Thus, to manually enable the EEE feature, corresponding ports at both ends of the network link across different vendors and control plane software are to be identified and then manually configured using configuration commands. Thus, a non-default and manual EEE configuration requirement increases the challenges of enabling the EEE feature, and in turn, results in lower adoption of EEE in conventional network devices.

To overcome the aforementioned issues, in the present disclosure, the EEE feature may be default enabled in the network device (e.g., all the ports of the network device) of the present disclosure. Further, the EEE capability of a link partner associated with each port of a network device and a link quality of a link between a port and the associated link partner may be utilized to control dynamic disablement and re-enablement of the EEE feature on each port. A network device can include, for example, a feature manager that may be configured to control the dynamic disablement and re-enablement of the EEE feature on each port of the network device.

While the EEE feature is enabled, the feature manager may be configured to receive a link signal from a link partner. The link signal may be received at a port of the network device. Based on the link signal, the feature manager may be configured to detect the link partner that is associated with the port (e.g., coupled to the port via a link). In a variety of embodiments, upon detection of the link partner, the feature manager may be configured to initiate auto-negotiation with the link partner.

The feature manager may be configured to determine a set of EEE parameters associated with the link partner. Based on the set of EEE parameters, the feature manager may be configured to control dynamic disablement and re-enablement of the EEE feature on the port. For example, the feature manager may be configured to disable the EEE feature on the port based on at least one of the set of EEE parameters being different from an acceptable state. In more embodiments, the feature manager may disable the EEE feature on the port by way of a command line interface ("CLI").

In additional embodiments, the set of EEE parameters may include an EEE capability of the link partner. In such a scenario, the acceptable state can correspond to the EEE capability of the link partner being enabled, being the same as that of the port of the network device, and/or being agreed between the network device and the link partner. During the auto-negotiation, the feature manager may be configured to receive an EEE advertisement from the link partner. The EEE advertisement may be configured to indicate the EEE capability of the link partner. Thus, the feature manager may be configured to determine the EEE capability of the link partner based on the EEE advertisement.

In further embodiments, the feature manager may be configured to disable the EEE feature on the port of the network device based on the EEE capability of the link partner being different from that of the port. Similarly, the feature manager may be configured to disable the EEE feature on the port based on the EEE capability of the link partner being disabled. Further, the feature manager may be configured to disable the EEE feature on the port based on the EEE capability of the link partner being disagreed between the network device and the link partner. The disagreement between the network device and the link partner may be based on the auto-negotiation. After the disablement of the EEE feature on the port, the feature manager may be configured to initiate auto-negotiation with the link partner. In such a scenario, the communication between the network device (e.g., the port) and the link partner may be executed without EEE.

In numerous embodiments, the EEE feature on the port of the network device may remain enabled based on the EEE capability of the link partner being enabled, being the same as that of the port, and being agreed between the network device and the link partner. Thus, in several embodiments, all three requirements must be met for the EEE feature to remain enabled. In such a scenario, the feature manager may be configured to establish (e.g., engage) the link between the port and the link partner.

In still more embodiments, the set of EEE parameters may include a link quality of the link between the port of the network device and the link partner. In such a scenario, the acceptable state corresponds to the link quality being above a threshold. In still further embodiments, the network device may include one or more link quality counters. The link quality counters may correspond to metrics used to assess the health and reliability of a network link. The link quality counters may measure various aspects of the performance of the network link. Examples of the link quality counters may include error counters, Signal-to-Noise Ratio ("SNR") counters, link flap counters, or the like. The error counters may be configured to track the number of errors encountered during data transmission, such as frame errors, cyclic redundancy check errors, bit rate errors, alignment errors, symbol errors, or the like. The SNR counters may be configured to measure the strength of a signal compared to background noise on a communication channel. The link flap counters may be configured to track the number of link flaps associated with a link. The link flaps may refer to a phenomenon where a link repeatedly transitions (e.g., flaps) between active and inactive states. The link quality counters may thus indicate EEE-based link behavior.

The feature manager may be configured to monitor the link quality counters. The link quality counters may be monitored when the link between the port of the network device and the link partner is engaged. The feature manager may be configured to determine the link quality of the link based on the monitoring of the link quality counters. The link quality may be defined based on at least one of a bit error rate, an SNR, or a number of link flaps associated with the link. In still additional embodiments, the link quality may be configured to indicate a health status of the link. In some more embodiments, the link quality may be configured to indicate data traffic accuracy on the link.

In further additional embodiments, the EEE feature on the port of the network device may remain enabled based on the link quality being above the threshold. In an example, when the link quality is defined based on the bit error rate, the threshold may correspond to $10^{-12}$. Conversely, the feature manager may be configured to disable the EEE feature on the port based on the link quality being below the threshold. After the disablement of the EEE feature on the port, the feature manager may be configured to initiate auto-negotiation with the link partner. In yet more embodiments, the feature manager may initiate the auto-negotiation with the link partner during a traffic idle period. In still yet more embodiments, the link may be part of an EtherChannel. EtherChannel may be a networking technology that combines multiple physical Ethernet links into a single logical link, providing increased bandwidth and redundancy. In such a scenario, the feature manager may be configured to push flows to other links before initiating the auto-negotiation. A flow may refer to a sequence of packets sent from a source to a destination, often identified by attributes like source and destination addresses, ports, and protocols.

In many further embodiments, the disablement of the EEE feature on the port of the network device may correspond to a disengagement of the link between the port and the link partner. The disengagement may be a function of the link quality of a unidirectional path of the link from the port to the link partner and another unidirectional path of the link from the link partner to the port being below the threshold. The scope of the present disclosure is, however, not limited to a complete disengagement of the link.

In many additional embodiments, the disablement of the EEE feature on the port of the network device may correspond to exclusively one unidirectional path of the link (e.g., from the port to the link partner or from the link partner to the port) operating in an EEE low power idle mode. In one example, the link quality of the unidirectional path of the link from the port to the link partner may be below the threshold while another unidirectional path of the link from the link partner to the port may be above the threshold. In such a scenario, the unidirectional path of the link from the port to the link partner may operate in the EEE low power idle mode. In another example, the link quality of the unidirectional path of the link from the link partner to the port may be below the threshold while another unidirectional path of the link from the port to the link partner may be above the threshold. In such a scenario, the unidirectional path of the link from the link partner to the port may operate in the EEE low power idle mode.

The EEE feature on the port may be disabled for a time period. In such a scenario, the feature manager may be configured to enable the EEE feature on the port upon expiration of the time period. In still yet further embodiments, the network device may include a timer that is started upon the disablement of the EEE feature on the port. When the timer runs out, the feature manager may enable the EEE feature again on the port. In still yet additional embodiments, the timer may be configurable. In several embodiments, the feature manager may implement a back-off algorithm to determine the time period.

Thus, if the EEE capability of the link partner is enabled, the same as that of the port, and agreed between the network device and the link partner, and the link quality of the link is above the threshold, the EEE feature may remain enabled and the link may continue to be engaged. In such a scenario, the feature manager may be configured to monitor whether the link is down. The link down state may result in a disablement of the EEE feature. Thus, after the link is down for a time duration (e.g., 10 seconds), the feature manager may be configured to enable the EEE feature and initiate the auto-negotiation with the same or different link partner. In a number of embodiments, if other counters, apart from the link quality counters of the network device, indicate improved link signal performance/characteristics, the feature manager may re-attempt the enablement of the EEE feature on the port. The EEE feature on other ports of the network device may be dynamically controlled in a similar manner as described above. Further, the link partner may also execute the dynamic control of the EEE feature on an associated port in a similar manner as described above.

In several more embodiments, prior to the link partner detection, the feature manager may be configured to determine whether a precision time protocol ("PTP") is enabled in the network device. The PTP is a protocol used to synchronize clocks throughout a network. The PTP may be required for applications that require precise timekeeping, such as financial trading systems, telecommunications, and industrial automation. If the PTP is enabled in the network device, the feature manager may be configured to determine whether the priority of the PTP is lower than the priority of the EEE feature. If the priority of the PTP is higher than or equal to the priority of the EEE feature, the feature manager may be configured to disable the EEE feature on each port of the network device.

Such dynamic disablement and re-enablement of the EEE feature ensures that the EEE feature can be default enabled on network devices. Further, the disablement of the EEE feature can be executed without manual intervention. Hence, the EEE management of the present disclosure is simpler than conventional techniques. Additionally, as the EEE feature is default enabled and disabled only when there are interoperability or data traffic errors, the energy consumed by the network device of the present disclosure is less than that consumed by conventional network devices where the EEE feature is default disabled. As a result, a higher degree of environmental sustainability can be achieved. Further, Energy Star ecolabel certifying agencies for switching products require the EEE feature to be enabled as a default out-of-the-box feature. Thus, the network device of the present disclosure can be eligible for the Energy Star certification.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board ("PCB") or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to the ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as a field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board, or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a networking environment 100 in accordance with various embodiments of the disclosure is shown. The embodiments depicted in FIG. 1 may show the networking environment 100 which can correspond to a network or a portion of the network. In many embodiments, the networking environment 100 may include a network device 102.

The network device 102 may include hardware and/or software components that facilitate communication and transmission of data between computers or other network-enabled devices. In a network, the network device 102 may contribute to establishing and maintaining connections. Examples of the network device 102 may include a router, a switch, a hub, a modem, an access point, a server, a computing node, or the like. The network device 102 may include various ports that facilitate network connectivity. In a number of embodiments, the network device 102 may include a plurality of ports, of which ports 104-108 are shown. In a variety of embodiments, the ports 104-108 may correspond to Ethernet ports.

In more embodiments, the networking environment 100 may include a plurality of link partners associated with the network device 102 (e.g., the plurality of ports). A link partner can correspond to a network device that couples to another network device via a network link. A network link may be a communication pathway that can couple two or more network devices, enabling data transmission between them. In additional embodiments, the plurality of link partners may include link partners 110-114 associated with the ports 104-108, respectively. Examples of the link partners 110-114 may include wireless local area network controllers ("WLCs"), switches, access points, servers, modems, routers, voice over Internet protocol ("VoIP") devices, or the like.

As illustrated in FIG. 1, the link partner 110 may be coupled to the port 104 of the network device 102 by way of a link 116. Similarly, the link partner 112 may be coupled to the port 106 of the network device 102 by way of a link 118. Further, the link partner 114 may be coupled to the port 108 of the network device 102 by way of a link 120. In further embodiments, each link partner may include a port to facilitate coupling to a port of the network device. The network device 102 may thus communicate with the link partners 110-114 by way of the links 116-120, respectively.

Traditionally, network devices have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources. The generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impacts can be measured with specific units to quantify these changes. Various aspects of energy use can be associated with one or more of these negative environmental impacts and classified as one or more sustainability-related attributes.

The operation of a coal-powered power plant may create a sizeable amount of negative environmental impacts in the form of, for example, carbon emissions. Contrast that with a solar array which may not create emissions when generating electricity, but may have negative environmental impacts, such as carbon emission generation, associated with the production and/or disposal of the solar array. Various methods of measuring these negative environmental impacts may occur. One measurement may be to examine waste products created by the power generated (such as nuclear waste, solar array e-waste, etc.).

To maximize the overall sustainability of a network, it may be desirable to limit the energy use. To that effect, it may be required to reduce the energy consumed by the network device 102. Energy Efficient Ethernet ("EEE") may be implemented in the network device 102 to reduce the energy footprint of the network device 102. EEE may be a set of enhancements to the Ethernet networking standard aimed at reducing energy consumption during periods of low data activity. EEE may implement mechanisms that allow Ethernet devices (e.g., the network device 102) to enter a low-power idle state when a network link, that connects the network device 102 to another device, is idle. The EEE feature in the network device 102 can thus decrease the energy usage without compromising performance. EEE can play a significant role in sustainability by reducing energy consumption in Ethernet ports, overall lowering operating costs, extending equipment lifespan, mitigating environmental impact, ensuring regulatory compliance, and enhancing corporate social responsibility efforts. Given the role EEE plays in environment sustainability, an optimized use of the EEE feature in the network device 102 may be required.

Conventionally, the use of the EEE feature in network devices led to various challenges. For example, the devices on both ends of a network link may not implement EEE in a compatible manner, leading to interoperability errors. Additionally, the use of the EEE feature may result in data traffic and link stability errors. Such errors may be predominant where the link partners either do not have the EEE support or where the EEE implementation is not robust enough in some speeds of Ethernet auto-negotiation. Auto-negotiation is an Ethernet protocol that may allow devices to exchange information about their capabilities and automatically configure to the best possible performance settings. As a result, the EEE feature is default disabled in conventional network devices. In such scenarios, the configuration of the EEE feature in the field requires manual intervention. Generally, both devices of the network link may be managed by different control plane software and/or have different hardware. Thus, to manually enable EEE, corresponding ports at both ends across different vendors and control plane software are to be identified and then manually configured using configuration commands. Thus, non-default and manual EEE configuration requirement increases the challenges of enabling the EEE feature, and in turn, results in lower adoption of EEE in conventional network devices.

To overcome the aforementioned issues, in the present disclosure, the EEE feature may be default enabled in the network device 102 (e.g., all the ports 104-108). Further, the EEE capability of a link partner associated with each port of the network device 102 and a link quality of a link between a port and the associated link partner may be utilized to control dynamic disablement and re-enablement of the EEE feature on each port. For example, each of the ports 104-108 has the EEE feature default enabled. When the link partner 110 is detected, if the EEE capability of the link partner 110 is disabled, is different from that of the port 104, or is disagreed between the network device 102 and the link partner 110, the EEE feature on the port 104 may be disabled and auto-negotiation with the link partner 110 may be initiated. Similarly, if the EEE capability of the link partner 110 is enabled, is the same as that of the port 104, and is agreed between the network device 102 and the link partner 110, the EEE feature may remain enabled on the port 104. The link 116 may then be engaged between the port 104 and the link partner 110. In such a scenario, the link quality of the link 116 may be monitored and if the link quality falls below a threshold, the EEE feature on the port 104 may be disabled and auto-negotiation with the link partner 110 may be initiated. The EEE feature may be disabled for a time period, and may be enabled again upon the expiration of the time period. The EEE feature on the ports 106 and 108 may be dynamically controlled in a similar manner.

Such dynamic disablement and re-enablement of the EEE feature ensures that the EEE feature can be default enabled on network devices (e.g., the network device 102). Further, the disablement of the EEE feature can be executed without manual intervention. Hence, the EEE management of the present disclosure is simpler than conventional techniques. Additionally, as the EEE feature is default enabled and disabled only when there are interoperability or data traffic errors, the energy consumed by the network device 102 is less than that consumed by conventional network devices where the EEE feature is default disabled. As a result, a higher degree of environmental sustainability can be achieved. Further, EnergyStar ecolabel certifying agencies for switching products require the EEE feature to be enabled as a default out-of-the-box feature. Thus, the network device 102 can be eligible for the EnergyStar certification.

Although a specific embodiment for the networking environment 100 is described above with respect to FIG. 1, any of a variety of systems and/or processes may be utilized in accordance with embodiments of the disclosure. For example, the networking environment 100 may include a different number of link partners coupled to an equivalent number of ports of the network device 102 by way of an equivalent number of links. The elements depicted in FIG. 1 may also be interchangeable with other elements of FIG. 2-9 as required to realize a particularly desired embodiment.

Figure 2:
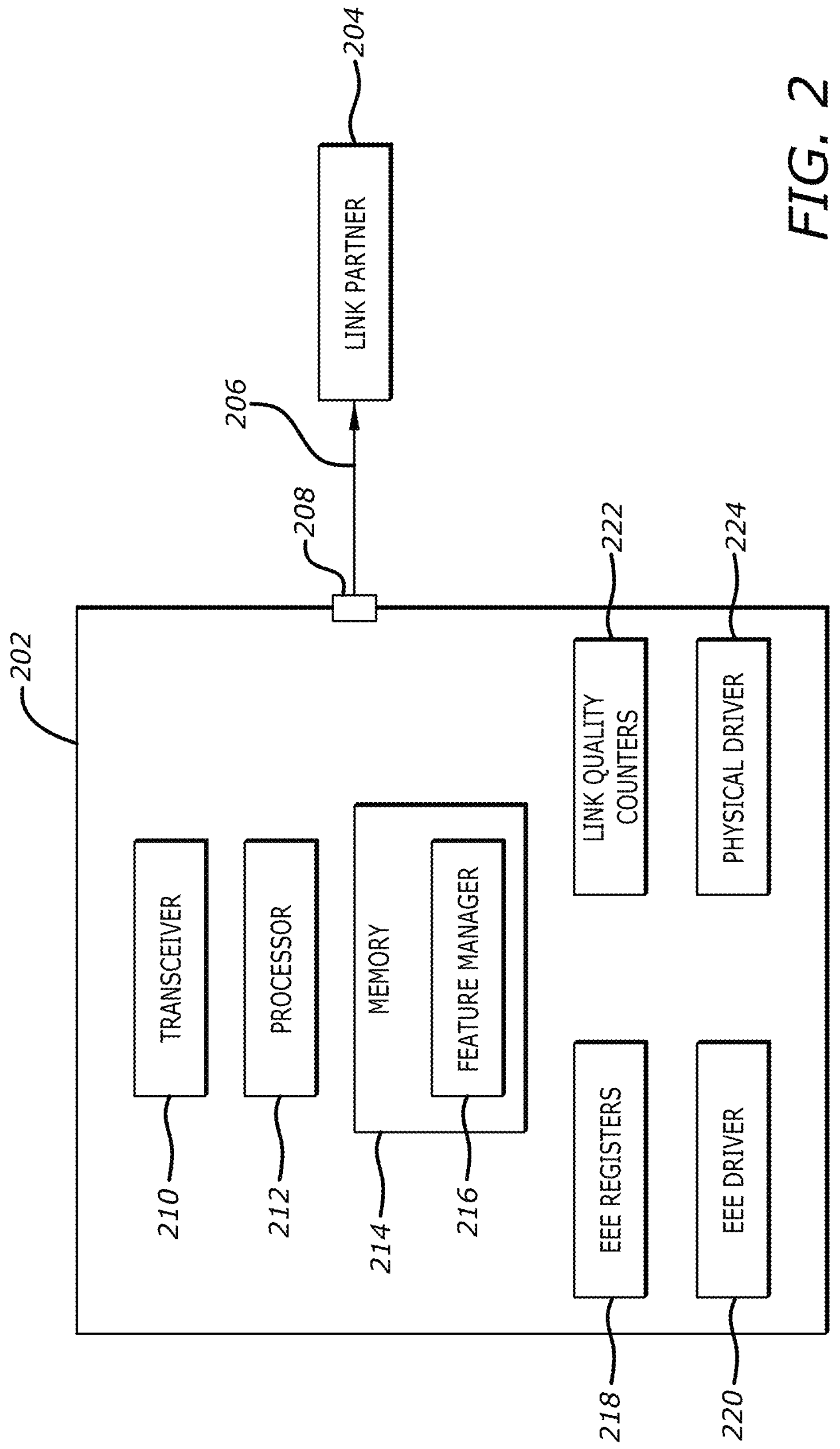
FIG. 2 is a schematic block diagram of a network device in accordance with various embodiments of the disclosure.

Referring to FIG. 2, a schematic block diagram of a network device 202 in accordance with various embodiments of the disclosure is shown. The network device 202 may include hardware and/or software components that facilitate communication and transmission of data between computers or other network-enabled devices. Examples of the network device 202 may include a router, a switch, a hub, a modem, an access point, a server, a computing node, or the like. The embodiments depicted in FIG. 2 may show the network device 202 configured to be in communication with a link partner 204 via a link 206. Examples of the link partner 204 may include WLCs, switches, access points, servers, modems, routers, VoIP devices, or the like. The link 206 may be a communication pathway that can couple two or more network devices, enabling data transmission between them.

The network device 202 may include a port 208 that facilitates network connectivity. The link partner 204 may be coupled to the port 208 of the network device 202 by way of the link 206. In many embodiments, the link partner 204 may include a port to facilitate coupling to the port 208. The network device 202 may include a transceiver 210, a processor 212, and a memory 214.

The transceiver 210 may enable transmission and reception of data over network links (e.g., the link 206). The transceiver 210 may support various data rates and communication standards, such as Ethernet, Fiber Channel, and Synchronous Optical Network/Synchronous Digital Hierarchy (SONET/SDH). The transceiver 210 may contribute to modern network architectures by enabling high-speed data transmission, long-distance connectivity, and the flexibility to adapt to evolving network requirements.

The processor 212 may include any suitable type of processor or a Central Processing Unit ("CPU"). The processor 212 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on a logical combination of the states of one or more other switching elements, such as logic gates. These basic switching elements can be combined to create more complex logic circuits, including registers, adders-subtractors, arithmetic logic units ("ALUs"), floating-point units, or the like.

The memory 214 may reside within or externally to the network device 202 and may include any suitable type of memory implemented using any suitable storage technology. For example, the memory 214 may include a Random Access Memory ("RAM"), a Nonvolatile Memory ("NVM"), or a combination of a RAM and an NVM. The memory 214 may include instructions to be performed by the processor 212.

The network device 202 can include a feature manager 216. The feature manager 216 can be a set of instructions stored within the memory 214 that, when executed by the processor 212, can carry out various functions associated with the dynamic enablement and disablement of the EEE feature in the network device 202. In the present disclosure, the EEE feature is default enabled on the port 208. The feature manager 216 may be configured to determine whether a Precision Time Protocol ("PTP") is enabled in the network device 202. The PTP is a protocol used to synchronize clocks throughout a network. The PTP may be required for applications that require precise timekeeping, such as financial trading systems, telecommunications, and industrial automation. Unlike simpler time synchronization protocols like a Network Time Protocol ("NTP"), the PTP can achieve sub-microsecond accuracy by compensating for variable delays inherent in network communication. If the PTP is not enabled in the network device 202, the EEE feature may remain enabled on the port 208. Conversely, if the PTP is enabled in the network device 202, the feature manager 216 may be configured to determine whether the priority of the PTP is lower than the priority of the EEE feature. If the priority of the PTP is lower than the priority of the EEE feature, the EEE feature may remain enabled on the port 208. Conversely, if the priority of the PTP is higher than or equal to the priority of the EEE feature, the feature manager 216 may be configured to disable the EEE feature on the port 208. In a number of embodiments, the feature manager 216 may disable the EEE feature on the port 208 by way of a command line interface ("CLI").

In a variety of embodiments, while the EEE feature remains enabled, the feature manager 216 may be configured to receive a link signal from the link partner 204. The link signal may be received at the port 208. Based on the link signal, the feature manager 216 may be configured to detect the link partner 204 that is associated with the port 208 (e.g., coupled to the port 208 via the link 206). In more embodiments, upon detection of the link partner 204, the feature manager 216 may be configured to initiate auto-negotiation with the link partner 204. Auto-negotiation is an Ethernet protocol that may allow devices to exchange information about their capabilities and automatically configure to the best possible performance settings.

The feature manager 216 may be configured to determine a set of EEE parameters associated with the link partner 204. Based on the set of EEE parameters, the feature manager 216 may be configured to control dynamic disablement and re-enablement of the EEE feature on the port 208. For example, the feature manager 216 may be configured to disable the EEE feature on the port 208 based on at least one of the set of EEE parameters being different from an acceptable state.

In additional embodiments, the set of EEE parameters may include an EEE capability of the link partner 204. In such a scenario, the acceptable state corresponds to at least one of the EEE capability of the link partner 204 being enabled, the EEE capability of the link partner 204 being the same as that of the port 208, or the EEE capability of the link partner 204 being agreed between the network device 202 and the link partner 204. During the auto-negotiation, the feature manager 216 may be configured to receive an EEE advertisement from the link partner 204. In further embodiments, the network device 202 may include EEE registers 218 that may be configured to store the EEE advertisement. The EEE advertisement may be configured to indicate the EEE capability of the link partner 204. Thus, the feature manager 216 may be configured to determine the EEE capability of the link partner 204 based on the EEE advertisement. In still more embodiments, the network device 202 may include an EEE driver 220. The EEE driver 220 may be responsible for implementing and managing EEE capabilities on Network Interface Controllers (NICs) or other network devices. The feature manager 216 may access the EEE advertisement by way of the EEE driver 220.

In still further embodiments, the feature manager 216 may be configured to disable the EEE feature on the port 208 based on the EEE capability of the link partner 204 being different from that of the port 208. Similarly, the feature manager 216 may be configured to disable the EEE feature on the port 208 based on the EEE capability of the link partner 204 being disabled. Further, the feature manager 216 may be configured to disable the EEE feature on the port 208 based on the EEE capability of the link partner 204 being disagreed between the network device 202 and the link partner 204. The disagreement between the network device 202 and the link partner 204 may be based on the auto-negotiation. After the disablement of the EEE feature on the port 208, the feature manager 216 may be configured to initiate the auto-negotiation with the link partner 204. In such a scenario, the communication between the network device 202 (e.g., the port 208) and the link partner 204 may be executed without EEE.

The EEE feature on the port 208 may remain enabled based on the EEE capability of the link partner 204 being enabled, being the same as that of the port 208, and being agreed between the network device 202 and the link partner 204. Thus, all three requirements must be met for the EEE feature to remain enabled. In such a scenario, the feature manager 216 may be configured to establish (e.g., engage) the link 206 between the port 208 and the link partner 204.

In still additional embodiments, the set of EEE parameters may include a link quality of the link 206 between the port 208 and the link partner 204. In such a scenario, the acceptable state corresponds to the link quality being above a threshold. In some more embodiments, the network device 202 may include link quality counters 222. The link quality counters 222 may correspond to metrics used to assess the health and reliability of a network link (e.g., the link 206). The link quality counters 222 may measure various aspects of the performance of the link 206. Examples of the link quality counters 222 may include error counters, Signal-to-Noise Ratio ("SNR") counters, link flap counters, or the like. The error counters may be configured to track the number of errors encountered during data transmission, such as frame errors, cyclic redundancy check errors, bit rate errors, alignment errors, symbol errors, or the like. The SNR counters may be configured to measure the strength of the signal compared to background noise on the communication channel. The link flap counters may be configured to track the number of link flaps associated with a link (e.g., the link 206). The link flaps may refer to a phenomenon where a link repeatedly transitions (e.g., flaps) between active and inactive states. The link quality counters 222 may thus indicate the EEE-based link behavior.

The feature manager 216 may be configured to monitor the link quality counters 222. The link quality counters 222 may be monitored when the link 206 is engaged. In yet more embodiments, the network device 202 may include a physical driver 224. The physical driver 224 may refer to hardware components or interfaces that physically connect network devices (e.g., the network device 202) to a transmission medium, such as cables or wired signals. The feature manager 216 may monitor the link quality counters 222 by way of the physical driver 224. The feature manager 216 may be configured to determine the link quality of the link 206 based on the monitoring of the link quality counters 222. The link quality may be defined based on at least one of a bit error rate, an SNR, or a number of link flaps associated with the link 206. In still yet more embodiments, the link quality may be configured to indicate a health status of the link 206. In many further embodiments, the link quality may be configured to indicate data traffic accuracy on the link 206.

The EEE feature on the port 208 may remain enabled based on the link quality being above the threshold. In an example, when the link quality is defined based on the bit error rate, the threshold may correspond to $10^{-12}$. Conversely, the feature manager 216 may be configured to disable the EEE feature on the port 208 based on the link quality being below the threshold. After the disablement of the EEE feature on the port 208, the feature manager 216 may be configured to initiate auto-negotiation with the link partner 204. In still yet further embodiments, the feature manager 216 initiates the auto-negotiation with the link partner 204 during a traffic idle period. In still yet additional embodiments, if the link 206 is part of an EtherChannel, the feature manager 216 may be configured to push flows to other links before initiating the auto-negotiation.

In several embodiments, the disablement of the EEE feature on the port 208 corresponds to disengagement of the link 206 between the port 208 and the link partner 204. The disengagement may be a function of the link quality of a unidirectional path of the link 206 from the port 208 to the link partner 204 and another unidirectional path of the link 206 from the link partner 204 to the port 208 being below the threshold. The scope of the present disclosure is, however, not limited to complete disengagement of the link 206.

In several more embodiments, the disablement of the EEE feature on the port 208 may correspond to exclusively one unidirectional path of the link 206 (e.g., from the port 208 to the link partner 204 or from the link partner 204 to the port 208) operating in an EEE low power idle mode. In one example, the link quality of the unidirectional path of the link 206 from the port 208 to the link partner 204 may be below the threshold while another unidirectional path of the link 206 from the link partner 204 to the port 208 may be above the threshold. In such a scenario, the unidirectional path of the link 206 from the port 208 to the link partner 204 may operate in the EEE low power idle. In another example, the link quality of the unidirectional path of the link 206 from the link partner 204 to the port 208 may be below the threshold while another unidirectional path of the link 206 from the port 208 to the link partner 204 may be above the threshold. In such a scenario, the unidirectional path of the link 206 from the link partner 204 to the port 208 may operate in the EEE low power idle mode.

The EEE feature on the port 208 may be disabled for a time period. In such a scenario, the feature manager 216 may be configured to enable the EEE feature on the port 208 upon expiration of the time period. In numerous embodiments, the network device 202 may include a timer that is started upon the disablement of the EEE feature on the port 208. When the timer runs out, the feature manager 216 may enable the EEE feature again on the port 208. In some examples, the timer may be configurable. In many additional embodiments, the feature manager 216 may implement a back-off algorithm to determine the time period.

If the priority of the EEE feature is higher than that of the PTP, the EEE capability of the link partner 204 is enabled, is the same as that of the port 208, and is agreed between the network device 202 and the link partner 204, and the link quality of the link 206 is above the threshold, the EEE feature may remain enabled and the link 206 may continue to be engaged. In such a scenario, the feature manager 216 may be configured to monitor whether the link 206 is down. The link down state may result in disablement of the EEE feature. Thus, after the link 206 is down for a time duration (e.g., 10 seconds), the feature manager 216 may be configured to re-enable the EEE feature and initiate the auto-negotiation with the same or different link partner. In further additional embodiments, if other counters, apart from the link quality counters 222, of the network device 202 indicate improved link signal performance/characteristics, the feature manager 216 may re-attempt the enablement of the EEE feature on the port 208.

Although it is described that the set of EEE parameters includes the EEE capability of the link partner 204 and the link quality of the link 206 between the port 208 and the link partner 204, the scope of the present disclosure is not limited to it. In numerous additional embodiments, the set of EEE parameters may include any other link layer parameter associated with the network device 202, the link partner 204, or the link 206, without deviating from the scope of the present disclosure. In other words, any other link layer parameter may be utilized to control dynamic disablement and re-enablement of the EEE feature.

Although a specific embodiment for the network device 202 is described above with respect to FIG. 2, any of a variety of systems and/or processes may be utilized in accordance with embodiments of the disclosure. For example, the EEE feature on other ports of the network device 202 may be dynamically controlled in a similar manner as described above. Further, the link partner 204 may also execute the dynamic control of the EEE feature on an associated port in a similar manner as described above. The elements depicted in FIG. 2 may also be interchangeable with other elements of FIGS. 1 and 3-9 as required to realize a particularly desired embodiment.

Figure 3:
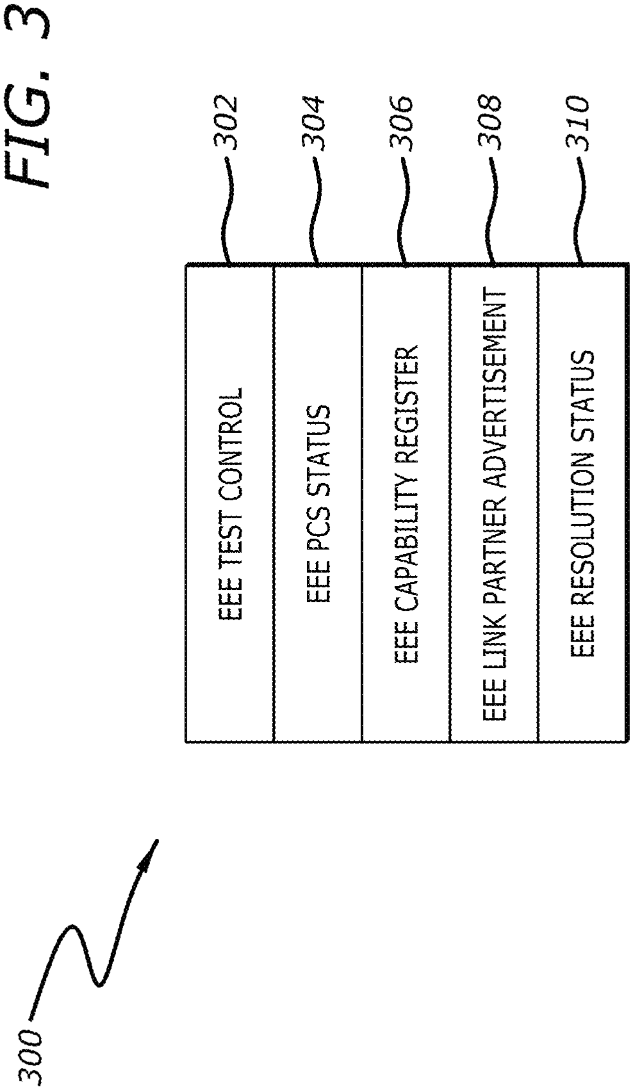
FIG. 3 is a conceptual diagram of Energy Efficient Ethernet ("EEE") functionalities for managing EEE features in network devices in accordance with various embodiments of the disclosure.

Referring to FIG. 3, a conceptual diagram of EEE functionalities 300 for managing EEE features in network devices in accordance with various embodiments of the disclosure is shown. In many embodiments, the EEE functionalities 300 may include an EEE test control functionality 302, an EEE Physical Coding Sublayer ("PCS") status functionality 304, and an EEE capability register functionality 306. In a number of embodiments, the EEE functionalities 300 may further include an EEE link partner advertisement functionality 308 and an EEE resolution status functionality 310.

The EEE test control functionality 302 may refer to a set of commands and mechanisms used to test and verify EEE in network devices. The EEE test control functionality 302 may allow network administrators and engineers to initiate tests that simulate various network conditions to ensure EEE features are working correctly. By performing these tests, one can assess the ability of a network device to enter and exit Low Power Idle ("LPI") states, measure power savings, and confirm that data integrity and performance are maintained during transitions. The EEE test control functionality 302 may be useful for validating energy efficiency mechanisms in a controlled environment before deploying them in a live network.

The EEE PCS status functionality 304 may indicate the current state and health of the PCS in relation to EEE. For example, the EEE PCS status functionality 304 may indicate whether the PCS is actively managing power consumption based on the network activity and correctly entering and exiting LPI states. The EEE PCS status functionality 304 may be useful for ensuring that the energy-saving features are functioning as intended and maintaining optimal performance.

The EEE capability register functionality 306 may specify the EEE features and capabilities supported by a network device. The EEE capability register functionality 306 may include information about the ability of the network device to operate in energy-efficient modes at various speeds (e.g., 100 megabits per second ("Mbps"), 1 gigabit per second ("Gbps"), 10 Gbps, or the like) and its compatibility with different EEE standards. The EEE capability register functionality 306 may provide network administrators an avenue to determine the energy-saving features available on the network device and configure the network device accordingly to optimize power consumption without sacrificing network performance.

The EEE link partner advertisement functionality 308 may refer to a process by which a link partner of the network device communicates its EEE capabilities during the auto-negotiation. The EEE link partner advertisement functionality 308 may provide an advertisement ensuring that both devices on either end of a network link are aware of each other's energy-efficient features and can synchronize their power-saving operations. An effective EEE link partner advertisement functionality 308 may be required to enable coordinated energy savings, as this functionality allows devices to optimize their power consumption while maintaining seamless data transmission and network performance.

The EEE resolution status functionality 310 may reflect the current operational state and adjustments of EEE mechanisms within a network device. The EEE resolution status functionality 310 may indicate whether the EEE features are enabled, actively saving energy, transitioning between power states, or disabled. Thus, the EEE resolution status functionality 310 may help network administrators understand how well EEE is working and whether the network device is successfully reducing power consumption without impacting network performance.

Although a specific embodiment for the EEE functionalities 300 is described above with respect to FIG. 3, any of a variety of systems and/or processes may be utilized in accordance with embodiments of the disclosure. For example, other EEE functionalities may also be utilized for managing the EEE features in network devices. The elements depicted in FIG. 3 may also be interchangeable with other elements of FIGS. 1, 2, and 4-9 as required to realize a particularly desired embodiment.

Figure 4:
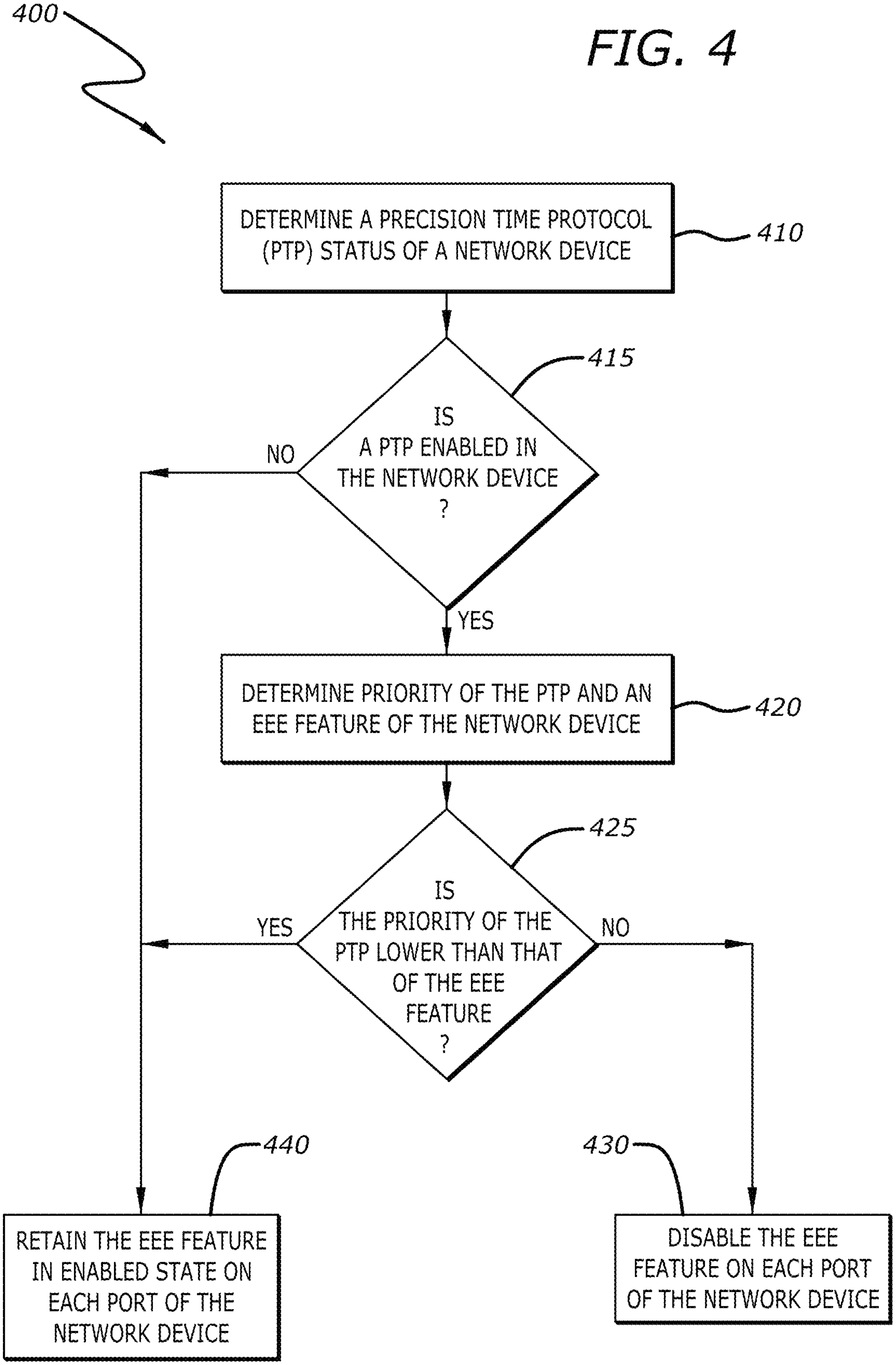
FIG. 4 is a flowchart depicting a process for controlling an EEE feature on a network device based on a Precision Time Protocol ("PTP") in accordance with various embodiments of the disclosure.

Referring to FIG. 4, a flowchart depicting a process 400 for controlling an EEE feature on a network device based on a PTP in accordance with various embodiments of the disclosure is shown. In many embodiments, the process 400 may determine a PTP status of each port of a network device (block 410). The PTP is a protocol used to synchronize clocks throughout a network. The PTP may be required for applications that require precise timekeeping, such as financial trading systems, telecommunications, and industrial automation. Unlike simpler time synchronization protocols like NTP, the PTP can achieve sub-microsecond accuracy by compensating for variable delays inherent in network communication.

In a number of embodiments, the process 400 may determine whether a PTP is enabled in the network device (block 415). The process 400 may determine whether the PTP is enabled in the network device based on the PTP status. In a variety of embodiments, in response to determining that the PTP is enabled in the network device, the process 400 may determine a priority of the PTP and an EEE feature of the network device (block 420).

In more embodiments, the process 400 may determine whether the priority of the PTP is lower than that of the EEE feature (block 425). In additional embodiments, in response to determining that the priority of the PTP is not lower than that of the EEE feature, the process 400 may disable the EEE feature on each port of the network device (block 430). In further embodiments, the EEE feature on each port may be disabled by way of a CLI.

However, in still more embodiments, in response to determining that the PTP is disabled in the network device, the process 400 may retain the EEE feature in an enabled state on each port of the network device (block 440). Similarly, in still further embodiments, in response to determining that the priority of the PTP is lower than that of the EEE feature, the process 400 may retain the EEE feature in the enabled state on each port of the network device (block 440). The PTP may thus be utilized for controlling the disablement of the EEE feature on the network device.

Although a specific embodiment of a process 400 for controlling the EEE feature on a network device based on the PTP suitable for carrying out the various steps, processes, methods, and operations described herein is discussed with respect to FIG. 4, any of a variety of systems and/or processes may be utilized in accordance with embodiments of the disclosure. For example, when the PTP and the EEE feature have the same priority, the EEE feature may be retained in the enabled state. The elements depicted in FIG. 4 may also be interchangeable with other elements of FIGS. 1-3 and 5-9 as required to realize a particularly desired embodiment.

Figure 5:
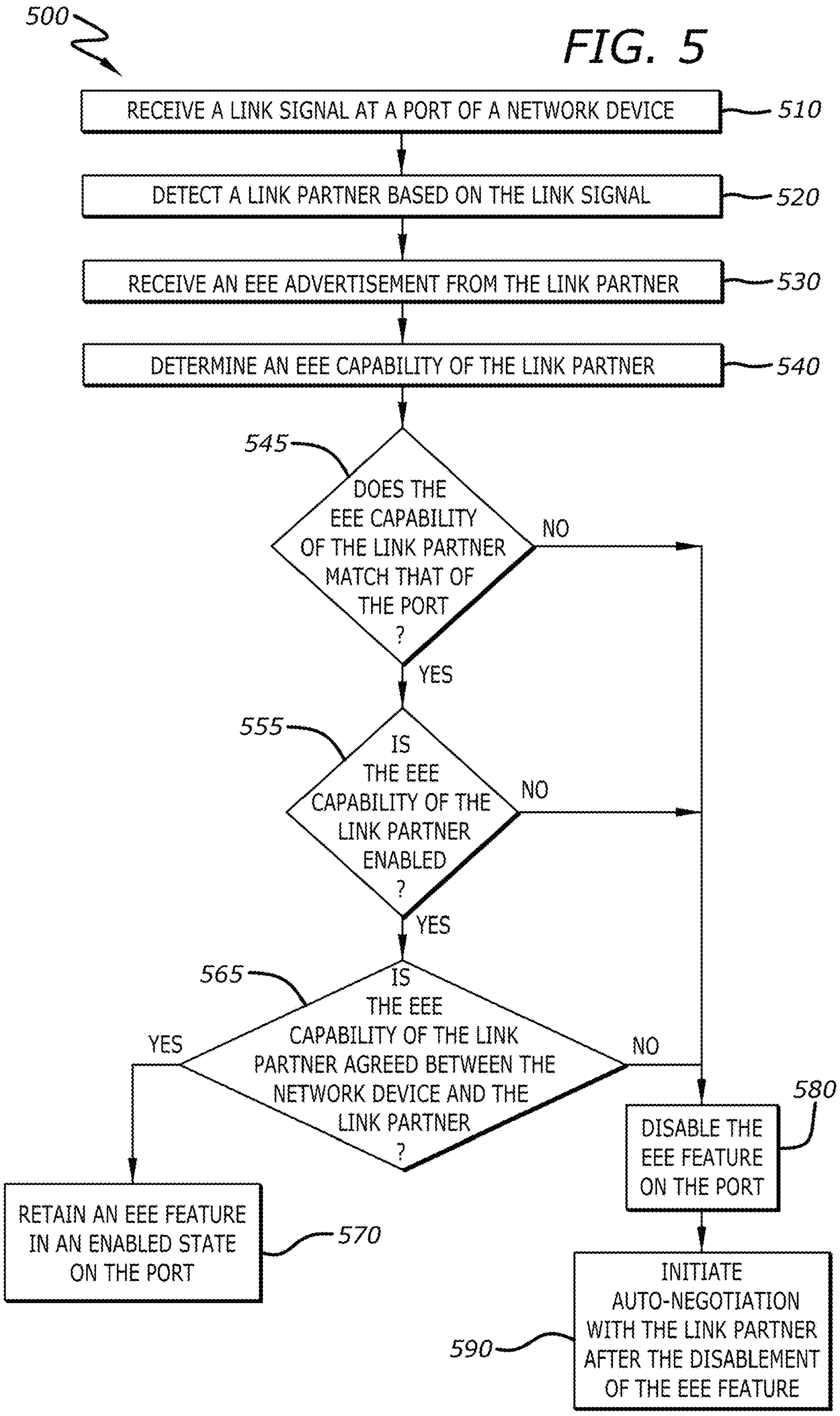
FIG. 5 is a flowchart depicting a process for controlling an EEE feature on a network device based on an EEE capability of a link partner in accordance with various embodiments of the disclosure.

Referring to FIG. 5, a flowchart depicting a process 500 for controlling an EEE feature on a network device based on an EEE capability of a link partner in accordance with various embodiments of the disclosure is shown. In many embodiments, the process 500 may receive a link signal at a port of a network device (block 510). An EEE feature may be default enabled on the port of the network device. The link signal may be received while an EEE feature is enabled on the port of the network device.

In a number of embodiments, the process 500 may detect a link partner based on the link signal (block 520). The link partner may be associated with the port (e.g., coupled to the port via a link). In a variety of embodiments, upon detection of the link partner, auto-negotiation may be initiated between the network device and the link partner. Auto-negotiation is an Ethernet protocol that may allow devices to exchange information about their capabilities and automatically configure to the best possible performance settings.

In more embodiments, the process 500 may receive an EEE advertisement from the link partner (block 530). The EEE advertisement may be received during the auto-negotiation. The EEE advertisement may be configured to indicate an EEE capability of the link partner.

In additional embodiments, the process 500 may determine the EEE capability of the link partner (block 540). The EEE capability of the link partner may be determined based on the EEE advertisement. The EEE capability of the link partner may be utilized to control the EEE feature on the port of the network device.

In further embodiments, the process 500 may determine whether the EEE capability of the link partner matches that of the port (block 545). In still more embodiments, whether the EEE capability of the link partner matches that of the port may be determined during the auto-negotiation. In still further embodiments, in response to the EEE capability of the link partner matching that of the port, the process 500 may determine whether the EEE capability of the link partner is enabled (block 555). In still additional embodiments, whether the EEE capability of the link partner is enabled may be determined during the auto-negotiation.

In some more embodiments, in response to the EEE capability of the link partner being enabled, the process 500 may determine whether the EEE capability of the link partner is agreed between the network device and the link partner (block 565). In yet more embodiments, the EEE capability of the link partner may be agreed or disagreed between the network device and the link partner during the auto-negotiation. In still yet more embodiments, in response to the EEE capability of the link partner being agreed between the network device and the link partner, the process 500 may retain an EEE feature in an enabled state on the port (block 570).

In many further embodiments, in response to determining that the EEE capability of the link partner does not match that of the port, the process 500 may disable the EEE feature on the port (block 580). Similarly, in many additional embodiments, in response to determining that the EEE capability of the link partner is disabled, the process 500 may disable the EEE feature on the port (block 580). Further, in still yet further embodiments, in response to determining that the EEE capability of the link partner is disagreed between the network device and the link partner, the process 500 may disable the EEE feature on the port (block 580).

In still yet additional embodiments, the process 500 may initiate the auto-negotiation with the link partner after the disablement of the EEE feature (block 590). In several embodiments, the auto-negotiation with the link partner may be initiated during a traffic idle period. In such a scenario, the communication between the network device (e.g., the port) and the link partner may be executed without EEE.

Although a specific embodiment of a process 500 for controlling the EEE feature on a network device based on an EEE capability of a link partner suitable for carrying out the various steps, processes, methods, and operations described herein is discussed with respect to FIG. 5, any of a variety of systems and/or processes may be utilized in accordance with embodiments of the disclosure. For example, after the disablement of the EEE feature, the network device may auto negotiate with a different link partner. The elements depicted in FIG. 5 may also be interchangeable with other elements of FIG. 1-4 and 6-9 as required to realize a particularly desired embodiment.

Figure 6:
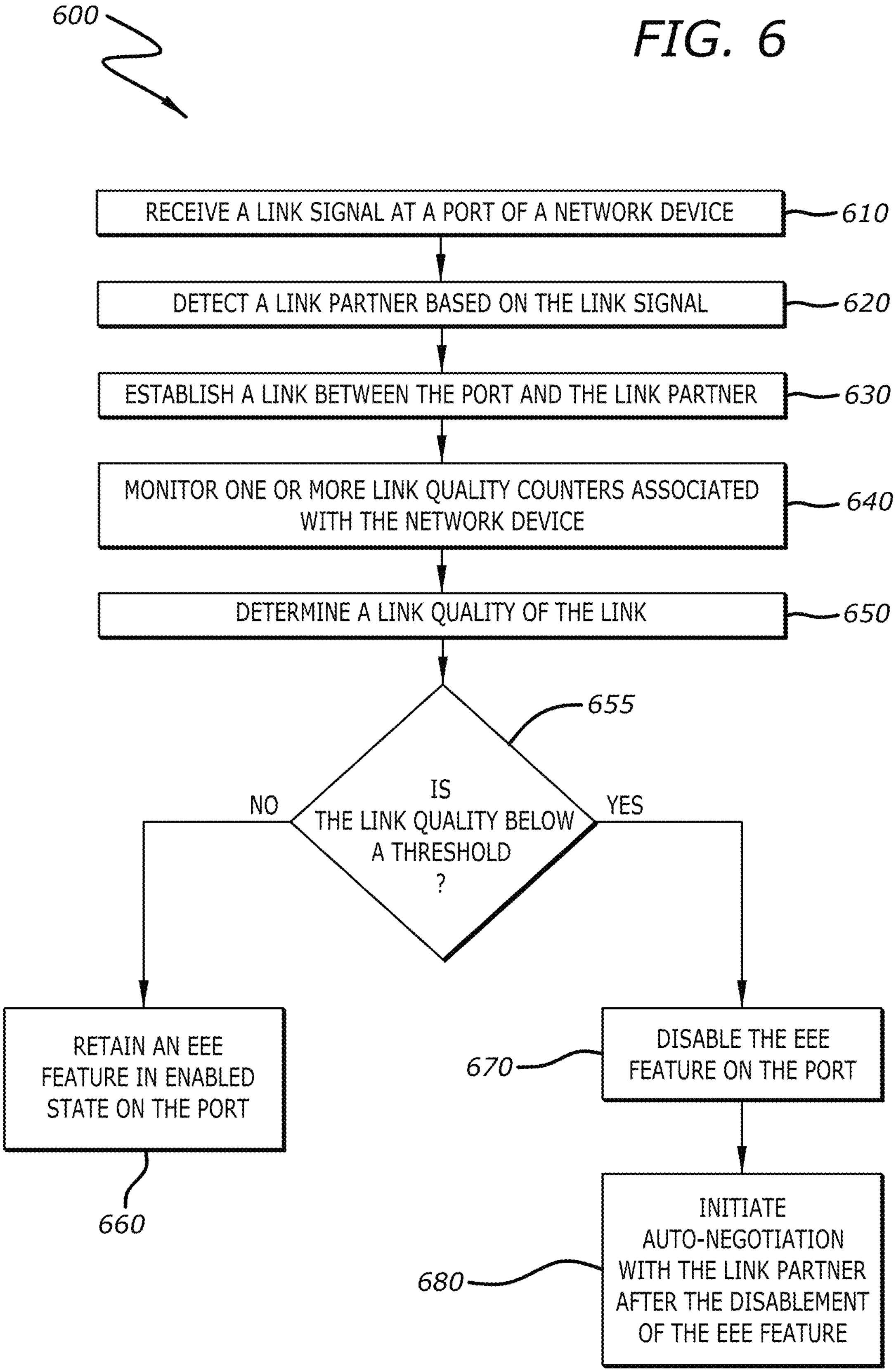
FIG. 6 is a flowchart depicting a process for controlling an EEE feature on a network device based on quality of a link between the network device and a link partner in accordance with various embodiments of the disclosure.

Referring to FIG. 6, a flowchart depicting a process 600 for controlling an EEE feature on a network device based on quality of a link between the network device and a link partner in accordance with various embodiments of the disclosure is shown. In many embodiments, the process 600 may receive a link signal at a port of a network device (block 610). An EEE feature may be default enabled on the port of the network device. The link signal may be received while an EEE feature is enabled on the port of the network device.

In a number of embodiments, the process 600 may detect a link partner based on the link signal (block 620). The link partner may be associated with the port (e.g., coupled to the port via a link). In a variety of embodiments, upon detection of the link partner, auto-negotiation may be initiated between the network device and the link partner.

In more embodiments, the process 600 may establish a link between the port and the link partner (block 630). The link may be a communication pathway that can couple the port of the network device and the link partner, enabling data transmission between them. In additional embodiments, the link partner may include a port to facilitate coupling to the port of the network device via the link.

In further embodiments, the process 600 may monitor one or more link quality counters associated with the network device (block 640). The one or more link quality counters may correspond to metrics used to assess the health and reliability of the link. The one or more link quality counters may measure various aspects of the performance of the link. Examples of the one or more link quality counters may include error counters, SNR counters, link flap counters, or the like. The error counters may be configured to track the number of errors encountered during data transmission, such as frame errors, cyclic redundancy check errors, bit rate errors, alignment errors, symbol errors, or the like. The SNR counters may be configured to measure the strength of the signal compared to background noise on a communication channel. The link flap counters may be configured to track the number of link flaps associated with a link. The link flaps may refer to the phenomenon where a link repeatedly transitions (e.g., flaps) between the active and inactive states. The link quality counters may thus indicate the EEE-based link behavior.

In still more embodiments, the process 600 may determine a link quality of the link (block 650). The link quality of the link may be determined based on the monitoring of the one or more link quality counters. The link quality may be defined based on at least one of a bit error rate, an SNR, or a number of link flaps associated with the link. In still further embodiments, the link quality may be configured to indicate a health status of the link. In still additional embodiments, the link quality may be configured to indicate data traffic accuracy on the link.

In some more embodiments, the process 600 may determine whether the link quality is below a threshold (block 655). In an example, when the link quality is defined based on the bit error rate, the threshold may correspond to $10^{-12}$. In yet more embodiments, in response to the link quality being equal to or above the threshold, the process 600 may retain the EEE feature in an enabled state on the port (block 660).

However, in still yet more embodiments, in response to the link quality being below the threshold, the process 600 may disable the EEE feature on the port (block 670). In many further embodiments, the EEE feature on the port may be disabled by way of a CLI. Thus, the monitoring of the link quality of the link can facilitate dynamic control of the EEE feature on the network device.

In many additional embodiments, the process 600 may initiate the auto-negotiation with the link partner after the disablement of the EEE feature (block 680). In still yet further embodiments, the auto-negotiation with the link partner may be initiated during a traffic idle period. In such a scenario, the communication between the network device (e.g., the port) and the link partner may be executed without EEE.

Although a specific embodiment of a process 600 for controlling an EEE feature on a network device based on quality of a link between the network device and a link partner suitable for carrying out the various steps, processes, methods, and operations described herein is discussed with respect to FIG. 6, any of a variety of systems and/or processes may be utilized in accordance with embodiments of the disclosure. For example, if a link between the network device and the link partner is part of an EtherChannel, flows may be pushed to other links before initiating the auto-negotiation. The elements depicted in FIG. 6 may also be interchangeable with other elements of FIG. 1-5 and 7-9 as required to realize a particularly desired embodiment.

Figure 7:
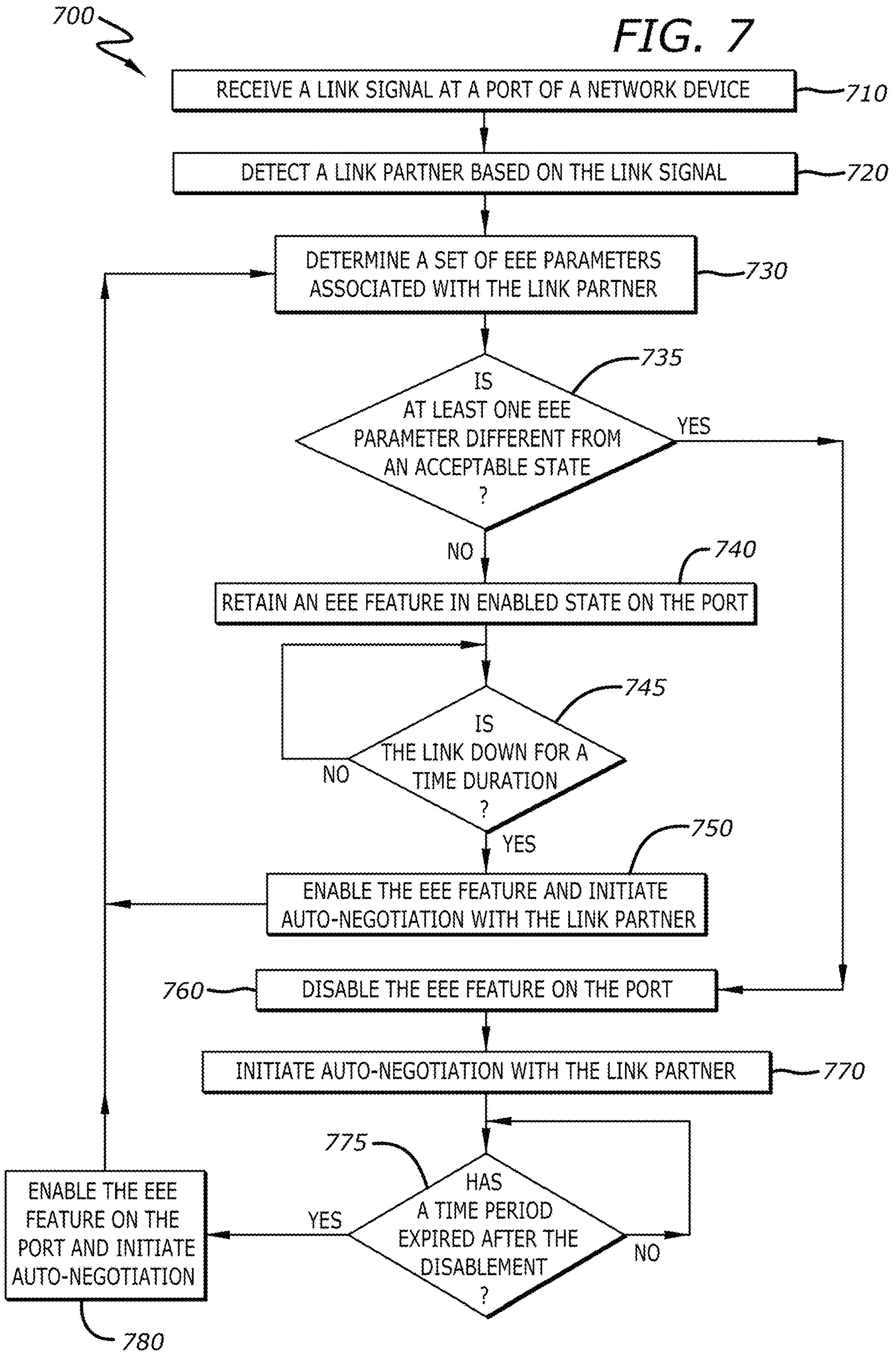
FIG. 7 is a flowchart depicting a process for dynamic disablement and enablement of an EEE feature on a network device in accordance with various embodiments of the disclosure.

Referring to FIG. 7, a flowchart depicting a process 700 for dynamic disablement and enablement of an EEE feature on a network device in accordance with various embodiments of the disclosure is shown. In many embodiments, the process 700 may receive a link signal at a port of a network device (block 710). An EEE feature may be default enabled on the port of the network device. The link signal may be received while the EEE feature is enabled.

In a number of embodiments, the process 700 may detect a link partner based on the link signal (block 720). The link partner may be associated with the port (e.g., coupled to the port via a link). In a variety of embodiments, upon detection of the link partner, auto-negotiation may be initiated between the network device and the link partner.

In more embodiments, the process 700 may determine a set of EEE parameters associated with the link partner (block 730). In additional embodiments, the set of EEE parameters may include an EEE capability of the link partner. In further embodiments, the set of EEE parameters may include a link quality of a link between the network device and the link partner.

In still more embodiments, the process 700 may determine whether at least one EEE parameter is different from an acceptable state (block 735). When the set of EEE parameters includes the EEE capability of the link partner, the acceptable state corresponds to the EEE capability of the link partner being enabled, being the same as that of the port, and/or being agreed between the network device and the link partner. Similarly, when the set of EEE parameters includes the link quality of the link between the network device and the link partner, the acceptable state corresponds to the link quality being above a threshold.

In still further embodiments, in response to determining that the set of EEE parameters is the same as the acceptable state, the process 700 may retain the EEE feature in the enabled state on the port (block 740). Thus, the EEE feature may be retained in the enabled state when the EEE capability of the link partner is enabled, is the same as that of the port, and is agreed between the network device and the link partner. Similarly, the EEE feature may be retained in the enabled state when the link quality of the link between the network device and the link partner is above the threshold.

In still additional embodiments, the process 700 may determine whether the link is down for a time duration (block 745). In some more embodiments, in response to determining that the link is not down for the time duration, the process 700 may continue to wait. In other words, the process 700 may continue to determine whether the link is down for the time duration (block 745).

However, in yet more embodiments, in response to determining that the link is down for the time duration, the process 700 may enable the EEE feature and initiate auto-negotiation with the link partner (block 750). The link down state may result in a disablement of the EEE feature and hence an enablement may be required. After the enablement and the auto-negotiation, the process 700 may determine the set of EEE parameters associated with the link partner (block 730).

In still yet more embodiments, in response to determining that at least one EEE parameter is different from the acceptable state, the process 700 may disable the EEE feature on the port (block 760). In many further embodiments, the EEE feature on the port may be disabled by way of a CLI. The EEE feature is thus dynamically disabled based on the capability of the link partner and the health of the link.

In many additional embodiments, the process 700 may initiate the auto-negotiation with the link partner (block 770). The auto-negotiation may be initiated after the disablement of the EEE feature. In still yet further embodiments, the auto-negotiation with the link partner may be initiated during a traffic idle period. In such a scenario, the communication between the network device (e.g., the port) and the link partner may be executed without EEE.

In still yet additional embodiments, the process 700 may determine whether a time period has expired after the disablement (block 775). The EEE feature on the port may be disabled for the time period. In several embodiments, the network device may include a timer that is started upon the disablement of the EEE feature on the port. In several more embodiments, in response to determining that the time period has not expired, the process 700 may continue to wait. In other words, the process 700 may continue to determine whether the time period has expired (block 775).

In numerous embodiments, in response to determining that the time period has expired, the process 700 may enable the EEE feature on the port and initiate auto-negotiation (block 780). The EEE feature may be enabled when the timer runs out. Further, the auto-negotiation may be initiated with the same or different link partner (e.g., the process 700 may determine a set of EEE parameters associated with the link partner (block 730)).

Although a specific embodiment of a process 700 for dynamic disablement and enablement of the EEE feature on a network device suitable for carrying out the various steps, processes, methods, and operations described herein is discussed with respect to FIG. 7, any of a variety of systems and/or processes may be utilized in accordance with embodiments of the disclosure. For example, the EEE feature may be enabled again when a new link partner is detected. The elements depicted in FIG. 7 may also be interchangeable with other elements of FIG. 1-6, 8, and 9 as required to realize a particularly desired embodiment.

Figure 8:
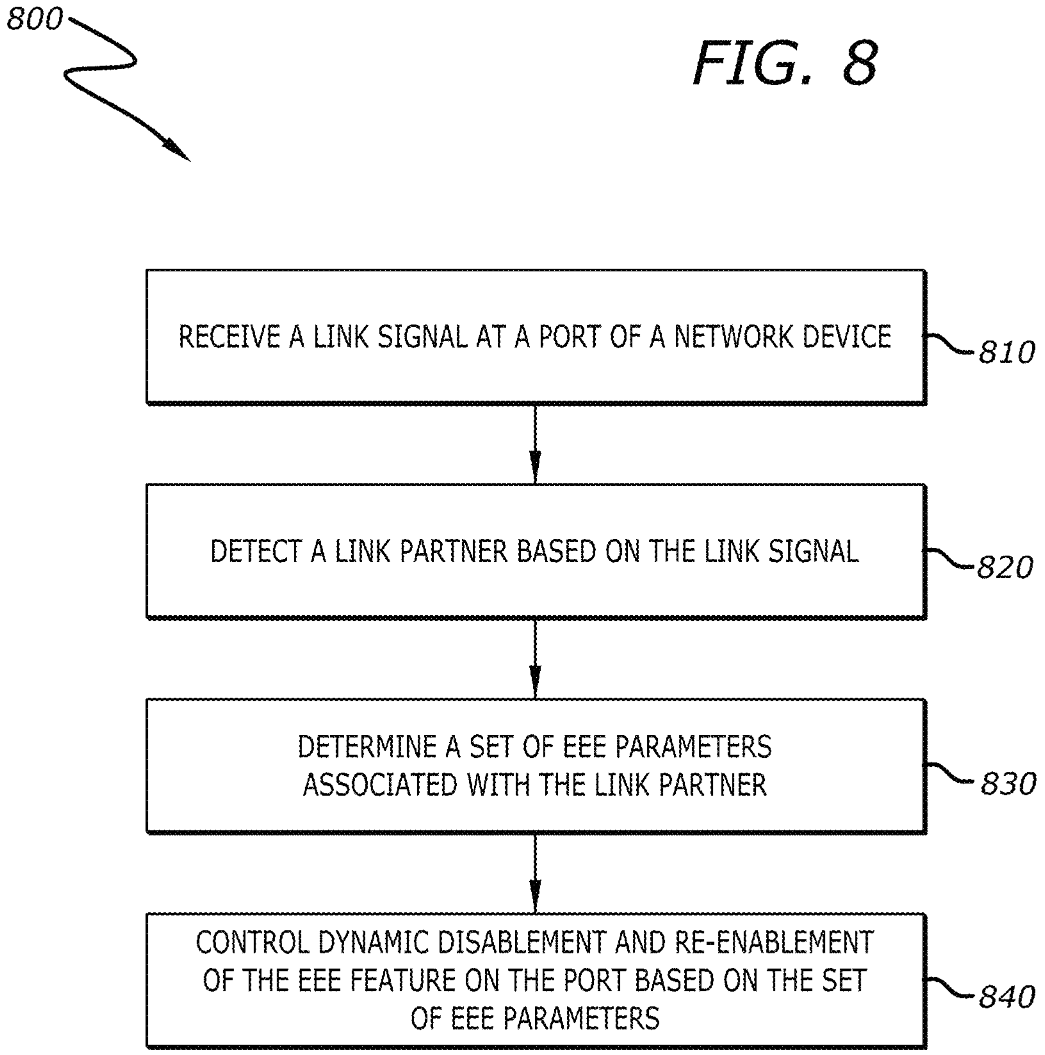
FIG. 8 is a flowchart depicting a process for dynamic management of an EEE feature on a network device in accordance with various embodiments of the disclosure.

Referring to FIG. 8, a flowchart depicting a process 800 for dynamic management of an EEE feature on a network device in accordance with various embodiments of the disclosure is shown. In many embodiments, the process 800 may receive a link signal at a port of a network device (block 810). An EEE feature may be default enabled on the port of the network device. The link signal may be received while the EEE feature is enabled.

In a number of embodiments, the process 800 may detect a link partner based on the link signal (block 820). The link partner may be associated with the port (e.g., coupled to the port via a link). In a variety of embodiments, upon detection of the link partner, auto-negotiation may be initiated between the network device and the link partner.

In more embodiments, the process 800 may determine a set of EEE parameters associated with the link partner (block 830). In additional embodiments, the set of EEE parameters may include an EEE capability of the link partner. In further embodiments, the set of EEE parameters may include a link quality of a link between the network device and the link partner.

In still more embodiments, the process 800 may control dynamic disablement and re-enablement of the EEE feature on the port (block 840) based on the set of EEE parameters. The EEE feature may be disabled if at least one of the set of EEE parameters is different from an acceptable state. The EEE feature on the port may be disabled for the time period. In such a scenario, the EEE feature may be enabled on the port upon expiration of the time period.

Although a specific embodiment of a process 800 for dynamic management of the EEE feature on a network device suitable for carrying out the various steps, processes, methods, and operations described herein is discussed with respect to FIG. 8, any of a variety of systems and/or processes may be utilized in accordance with embodiments of the disclosure. For example, the EEE feature on the link partner may be dynamically managed in a similar manner as described above. The elements depicted in FIG. 8 may also be interchangeable with other elements of FIG. 1-7 and 9 as required to realize a particularly desired embodiment.

Figure 9:
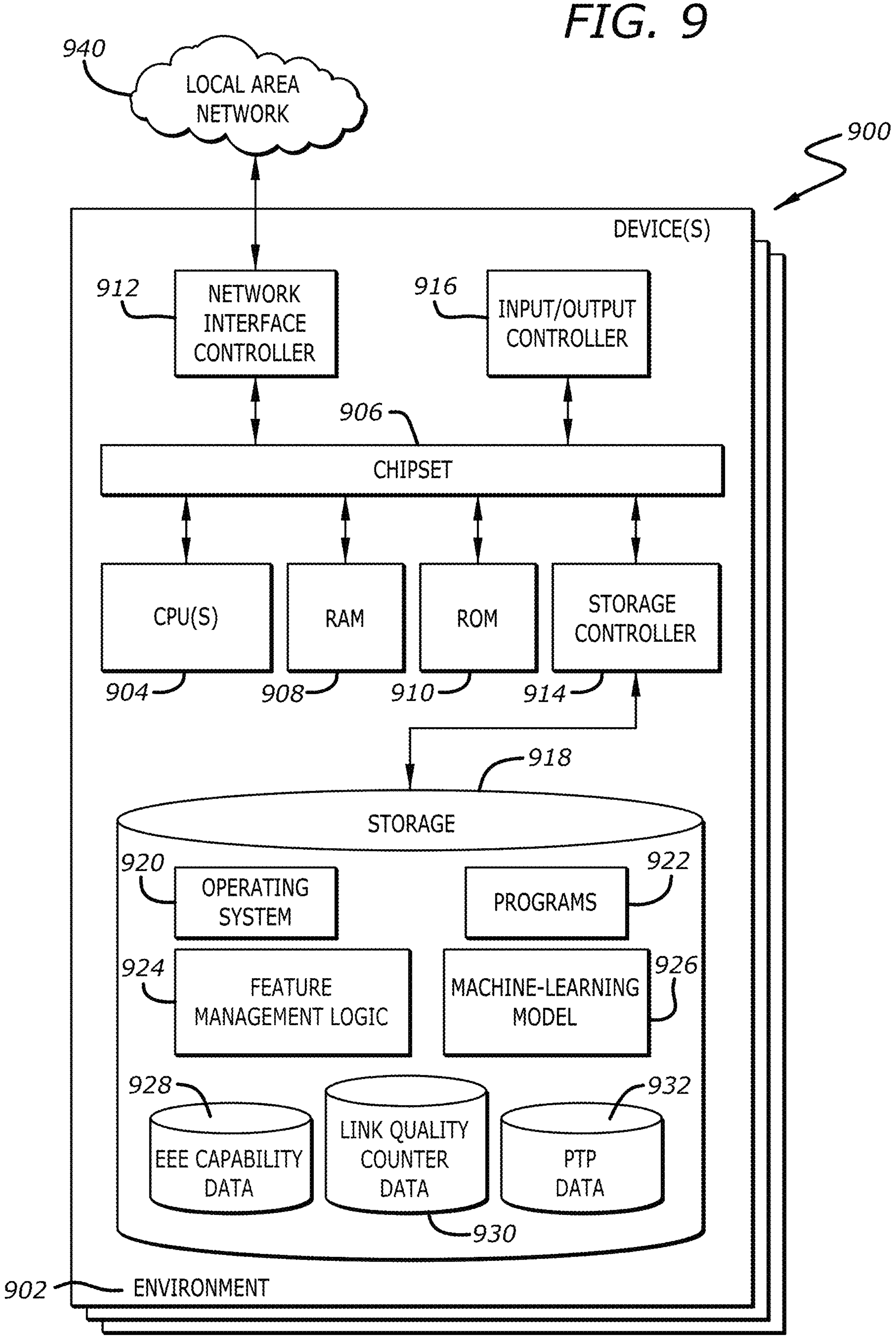
FIG. 9 is a conceptual block diagram for one or more devices capable of executing components and logic for implementing the functionality and embodiments described above.

Referring to FIG. 9, a conceptual block diagram for one or more devices 900 capable of executing components and logic for implementing the functionality and embodiments described above is shown. The embodiment of the conceptual block diagram depicted in FIG. 9 can illustrate a conventional server computer, workstation, desktop computer, laptop, tablet, network appliance, e-reader, smartphone, or other computing devices, and can be utilized to execute any of the application and/or logic components presented herein. The device 900 may, in some examples, correspond to physical devices or virtual resources described herein.

In many embodiments, the device 900 may include an environment 902 such as a baseboard or a "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, CPUs, can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, ALUs, floating-point units, or the like.

In certain embodiments, the chipset 906 may provide an interface between the processor(s) 904 and the remainder of the components and devices within the environment 902. The chipset 906 can provide an interface to a RAM 908, which can be used as the main memory in the device 900 in some embodiments. The chipset 906 can further be configured to provide an interface to a computer-readable storage medium such as a read-only memory ("ROM") 910 or a Non-volatile RAM ("NVRAM") for storing basic routines that can help with various tasks such as, but not limited to, starting up the device 900 and/or transferring information between the various components and devices. The ROM 910 or the NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface controller ("NIC") 912, which may include a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, applications or programs 922, EEE capability data 928, link quality counter data 930, and PTP data 932, which are described in greater detail below. The storage 918 can be connected to the environment 902 through a storage controller 914 connected to the chipset 906. In certain embodiments, the storage 918 can include one or more physical storage units. The storage controller 914 can interface with the physical storage units through a serial attached Small Computer System Interface (SCSI), that is, a serial attached SCSI ("SAS") interface, a serial advanced technology attachment ("SATA") interface, a fiber channel ("FC") interface, or other type of interface for physically connecting and transferring data between computers and physical storage units.

The device 900 can store data within the storage 918 by transforming the physical state of the physical storage units to reflect the information being stored. The specific transformation of the physical state can depend on various factors. Examples of such factors can include, but are not limited to, the technology used to implement the physical storage units, whether the storage 918 is characterized as primary storage, secondary storage, or the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media may refer to any available media that provides for the non-transitory storage of data and that can be accessed by the device 900. In some examples, the operations performed by a cloud computing network, and/or any components included therein, may be supported by one or more devices similar to the device 900. Stated otherwise, some or all of the operations performed by the cloud computing network, and/or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media may include, but is not limited to, the RAM 908, the ROM 910, an Erasable Programmable ROM ("EPROM"), an Electrically Erasable Programmable ROM ("EEPROM"), a flash memory or other solid-state memory technology, a compact disc ROM ("CDROM"), a digital versatile disk ("DVD"), a high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store the operating system 920 utilized to control the operation of the device 900. According to one embodiment, the operating system 920 includes the LINUX operating system. According to another embodiment, the operating system 920 includes the WINDOWS® SERVER operating system from MICROSOFT Corporation of Redmond, Washington. According to further embodiments, the operating system 920 can include the UNIX operating system or one of its variants. It should be appreciated that other operating systems can also be utilized. The storage 918 can store other system or application programs and data utilized by the device 900.

In various embodiments, the storage 918 or other computer-readable storage media is encoded with computer-executable instructions which, when loaded into the device 900, may transform the device 900 from a general-purpose computing system into a special-purpose computer capable of implementing the embodiments described herein. These computer-executable instructions may be stored as applications or programs 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIG. 1-9. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9, and can include other components that are not explicitly shown in FIG. 9, or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines ("VMs") running on the device 900 to perform the functions described herein. The virtualization layer may generally support a virtual resource that performs at least a portion of the techniques described herein.

In many embodiments, the device 900 can include a feature management logic 924 that can be configured to perform one or more of the various steps, processes, operations, and/or other methods that are described above. Often, the feature management logic 924 can be a set of instructions stored within a non-volatile memory that, when executed by the processor(s)/controller(s) 904 can carry out these steps, etc. In some embodiments, the feature management logic 924 may be a client application that resides on a network-connected device, such as, but not limited to, a server, switch, personal or mobile computing device, or an access point.

In certain embodiments, the feature management logic 924 may be configured to detect a link partner associated with a port of a network device (e.g., coupled to the port via a link). In the present disclosure, the EEE feature is default enabled on all ports of the network device. The feature management logic 924 may be configured to determine a set of EEE parameters associated with the link partner. Based on the set of EEE parameters, the feature management logic 924 may be configured to control dynamic disablement and re-enablement of the EEE feature on the port. For example, the feature management logic 924 may be configured to disable the EEE feature on the port based on at least one of the set of EEE parameters being different from an acceptable state.

The set of EEE parameters may include an EEE capability of the link partner. In such a scenario, the feature management logic 924 may be configured to disable the EEE feature on the port based on the EEE capability of the link partner being different from that of the port, the EEE capability of the link partner being disabled, or the EEE capability of the link partner being disagreed between the network device and the link partner. The set of EEE parameters may also include a link quality of the link between the port and the link partner. In such a scenario, the feature management logic 924 may be configured to disable the EEE feature on the port based on the link quality being below a threshold. After the disablement of the EEE feature on the port, the feature management logic 924 may be configured to initiate auto-negotiation with the link partner. The EEE feature on the port may be disabled for a time period. In such a scenario, the feature management logic 924 may be configured to enable the EEE feature on the port upon expiration of the time period.

In a number of embodiments, the storage 918 can include the EEE capability data 928. The EEE capability data 928 may be configured to indicate whether a link partner has an EEE capability. Additionally, the EEE capability data 928 may be configured to indicate whether the EEE capability of the link partner is enabled. Further, the EEE capability data 928 may be configured to indicate whether the EEE capability of the link partner matches that of a network device (e.g., a port of the network device). The EEE capability data 928 may also be configured to indicate whether the EEE capability of the link partner is agreed between the network device and the link partner.

In various embodiments, the storage 918 can include the link quality counter data 930. The link quality counter data 930 may include error data, SNR data, and/or link flap data. The error data may indicate the number of errors encountered during data transmission, such as frame errors, cyclic redundancy check errors, bit rate errors, alignment errors, symbol errors, or the like. The SNR data may be a measure of the strength of the signal compared to background noise on the communication channel. The link flap data may indicate the number of link flaps associated with a link. The link flaps may refer to the phenomenon where a link repeatedly transitions (e.g., flaps) between active and inactive states. The link quality counter data 930 may thus indicate the EEE-based link behavior.

In a number of embodiments, the storage 918 can include the PTP data 932. The PTP data 932 may indicate the PTP status of a network device. In other words, the PTP data 932 may indicate whether the PTP is enabled in the network device. The PTP is a protocol used to synchronize clocks throughout a network. The PTP may be required for applications that require precise timekeeping, such as financial trading systems, telecommunications, and industrial automation. The PTP data 932 may also indicate the priority of the PTP.

Finally, in many embodiments, data may be processed into a format usable by a machine-learning ("ML") model 926 (e.g., feature vectors), and or other processing techniques. The ML model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/ or other types of ML models 926. The ML model 926 may be configured to learn the EEE capability patterns of each type of link partner based on data related to historical EEE capability determination, and predict the EEE capability of a new link partner. Such predictions may be utilized to reduce the time taken for EEE disablement.

The ML model(s) 926 can be configured to generate inferences to make predictions or draw conclusions from data. An inference can be considered the output of a process of applying a model to new data. This can occur by learning from data and using that learning to predict future outcomes. These predictions are based on patterns and relationships discovered within the data. To generate an inference, a trained model can take input data and produce a prediction or a decision. The input data can be in various forms, such as images, audio, text, or numerical data, depending on the type of problem the model was trained to solve. The output of the trained model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for a device suitable for configuration with a feature management logic 924 for carrying out the various steps, processes, methods, and operations described herein is discussed with respect to FIG. 9, any of a variety of systems and/or processes may be utilized in accordance with embodiments of the disclosure. For example, the device 900 may be in a virtual environment such as a cloud-based network administration suite, or the device 900 may be distributed across a variety of network devices or switches. The elements depicted in FIG. 9 may also be interchangeable with other elements of FIG. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or different computing devices) to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

one or more ports, wherein each of the one or more ports has an Energy Efficient Ethernet ("EEE") feature default enabled; and a memory communicatively coupled to the processor, wherein the memory comprises a feature management logic that is configured to:

detect a link partner associated with a port of the one or more ports;

determine a set of EEE parameters associated with the link partner;

disable the EEE feature on the port based on at least one of the set of EEE parameters being different from an acceptable state;

determine whether an EEE capability of the link partner matches that of the port; and initiate auto-negotiation with the link partner after disablement of the EEE feature.

2. The device of claim 1, wherein the set of EEE parameters comprises an EEE capability of the link partner.

3. The device of claim 2, wherein the acceptable state corresponds to at least one of:

the EEE capability of the link partner being enabled, the EEE capability of the link partner being same as that of the port, or the EEE capability of the link partner being agreed between the device and the link partner.

4. The device of claim 2, wherein the feature management logic is further configured to:

receive an EEE advertisement from the link partner; and determine the EEE capability of the link partner based on the EEE advertisement.

5. The device of claim 2, wherein the feature management logic is further configured to disable the EEE feature on the port based on the EEE capability of the link partner being different from that of the port.

6. The device of claim 2, wherein the feature management logic is further configured to disable the EEE feature on the port based on the EEE capability of the link partner being disabled.

7. The device of claim 2, wherein the feature management logic is further configured to disable the EEE feature on the port based on the EEE capability of the link partner being disagreed between the device and the link partner.

8. The device of claim 1, wherein the feature management logic is further configured to receive a link signal from the link partner, and wherein the link partner is detected based on the link signal.

9. The device of claim 1, wherein the set of EEE parameters comprises a link quality of a link between the port and the link partner.

10. The device of claim 9, wherein the acceptable state corresponds to the link quality being above a threshold.

11. The device of claim 10, wherein the feature management logic is further configured to disable the EEE feature on the port based on the link quality being below the threshold.

12. The device of claim 9, further comprising one or more link quality counters, wherein the feature management logic is further configured to:

monitor the one or more link quality counters; and determine the link quality of the link based on the monitoring of the one or more link quality counters.

13. The device of claim 9, wherein the link quality is configured to indicate a health status of the link.

14. The device of claim 9, wherein the link quality is configured to indicate data traffic accuracy on the link.

15. The device of claim 9, wherein the link quality is defined based on at least one of: a bit error rate, a signal-to-noise ratio, or a number of link flaps associated with the link.

16. The device of claim 1, wherein the EEE feature on the port is disabled for a time period.

17. The device of claim 16, wherein the feature management logic is further configured to enable the EEE feature on the port upon expiration of the time period.

18. The device of claim 1, wherein the feature management logic is further configured to initiate auto-negotiation with the link partner after the disablement of the EEE feature on the port.

19. A device, comprising:

a processor;

one or more ports, wherein each of the one or more ports has an Energy Efficient Ethernet ("EEE") feature default enabled; and a memory communicatively coupled to the processor, wherein the memory comprises a feature management logic that is configured to:

detect a link partner associated with a port of the one or more ports;

determine a set of EEE parameters associated with the link partner; and control dynamic disablement and re-enablement of the EEE feature on the port based on the set of EEE parameters;

determine whether an EEE capability of the link partner matches that of the port; and initiate auto-negotiation with the link partner after disablement of the EEE feature.

20. A method, comprising:

detecting a link partner associated with a port of one or more ports of a device, wherein each of the one or more ports has an Energy Efficient Ethernet ("EEE") feature default enabled;

determining a set of EEE parameters associated with the link partner;

disabling the EEE feature on the port based on at least one of the set of EEE parameters being different from an acceptable state;

determining whether an EEE capability of the link partner matches that of the port; and initiating auto-negotiation with the link partner after disabling of the EEE feature.

* * * * *